United States Patent [19]

Schwan

[11] 3,883,539

[45] May 13, 1975

[54] 4-(2-CHLOROETHYLAMINO)-1-METHYLPIPERIDINE DIHYDROCHLORIDE

[76] Inventor: Thomas J. Schwan, 8 Hillview Dr., Norwich, N.Y. 13815

[22] Filed: Jan. 25, 1974

[21] Appl. No.: 436,460

[52] U.S. Cl............................ 260/293.87; 424/267
[51] Int. Cl.............................................. C07d 29/28
[58] Field of Search............................... 260/293.87

[56] References Cited
UNITED STATES PATENTS 2,496,956  2/1950  Reitsema ............................ 260/293

OTHER PUBLICATIONS

Hohenlohe–Oehringen et al., Monatsh. Chem. 96 (1), 246–256 (1965).

Primary Examiner—G. Thomas Todd

[57] ABSTRACT

The title compound is an anthelmintic agent.

1 Claim, No Drawings

4-(2-CHLOROETHYLAMINO)-1-METHYLPIPERIDINE DIHYDROCHLORIDE

This invention is concerned with the compound 4-(2-chloroethylamino)-1-methylpiperidine dihydrochloride. It is an anthelmintic agent. For example, when administered in a dose of about 300 mg/kg by gavage in an aqueous suspension to mice harboring *Ascaris suum* worms, it effects greater than 50 percent eradication of the worm population.

In order that this invention may be readily available to and understood by those skilled in the art, the now preferred method for its preparation is set forth:

To a cooled solution (10°) of 63.0 g (0.40 mole) of 4-(2-hydroxyethylamino)-1-methylpiperidine in 750 ml chloroform was added slowly with vigorous stirring 58.1 ml (95.2 g, 0.80 mole) of thionyl chloride. The mixture was stirred and refluxed for 3 hours and cooled. After the solvents were removed in vacuo the residue was taken up in 700 ml hot methanol. The solution was cooled and 175 ml methanol saturated with hydrogen chloride was added. Upon cooling there was obtained in two crops 58 g (58 percent) of the product, m.p. 264°–268°. The analytical sample, m.p. 267°–269°, was obtained by recrystallization from absolute ethanol.

Anal. Calcd. for $C_8H_{17}ClN_2 \cdot 2HCl$: C, 38.49; H, 7.67; Cl, 42.61; N, 11.23

Found: C, 38.57; H, 7.85; Cl, 42.57; N, 11.28.

What is claimed is:

1. 4-(2-Chloroethylamino)-1-methylpiperidine dihydrochloride.

* * * * *